United States Patent [19]

Beever

[11] Patent Number: 4,892,600
[45] Date of Patent: Jan. 9, 1990

[54] METHOD AND APPARATUS FOR PULTRUDING NON-LINEAR THERMOPLASTIC COMPOSITE ARTICLES

[75] Inventor: William H. Beever, Bartlesville, Okla.

[73] Assignee: Phillips Petroleum Company, Bartlesville, Okla.

[21] Appl. No.: 284,673

[22] Filed: Dec. 15, 1988

[51] Int. Cl.$^4$ .................. B32B 27/02; B32B 31/12; B31F 1/00

[52] U.S. Cl. .................. 156/166; 156/180; 156/201; 156/441; 156/461; 264/258; 264/285

[58] Field of Search ............... 156/161, 166, 178, 179, 156/180, 181, 199, 200, 201, 204, 441, 461, 245; 264/229, 231, 239, 257, 258, 257, 258, 285, 286, 280, 263, 294, 295, 296, 339; 425/122

[56] References Cited

U.S. PATENT DOCUMENTS

| | | | |
|---|---|---|---|
| 3,873,399 | 3/1975 | Goldsworthy et al. | 156/441 |
| 4,194,873 | 3/1980 | Killmeyer | 425/93 |
| 4,289,465 | 9/1981 | Killmeyer et al. | 425/111 |
| 4,296,060 | 10/1981 | Killmeyer et al. | 264/137 |
| 4,445,957 | 5/1984 | Harvey | 156/441 |
| 4,469,541 | 9/1984 | Goldsworthy | 156/180 |
| 4,820,366 | 4/1989 | Beever et al. | 156/433 |

Primary Examiner—Michael W. Ball
Assistant Examiner—Gregory J. Wilber
Attorney, Agent, or Firm—Laney, Dougherty, Hessin & Beavers

[57] ABSTRACT

A method and apparatus for continuously pultruding non-linear reinforced thermoplastic composite articles are provided. A fiber reinforcing material impregnated with a thermoplastic material is pulled through a heated forming die whereby a deformable composite is produced. The defomable composite is moved transversely to the direction in which it passes through the heated forming die while being cooled to produce one or more angular bends therein.

13 Claims, 1 Drawing Sheet

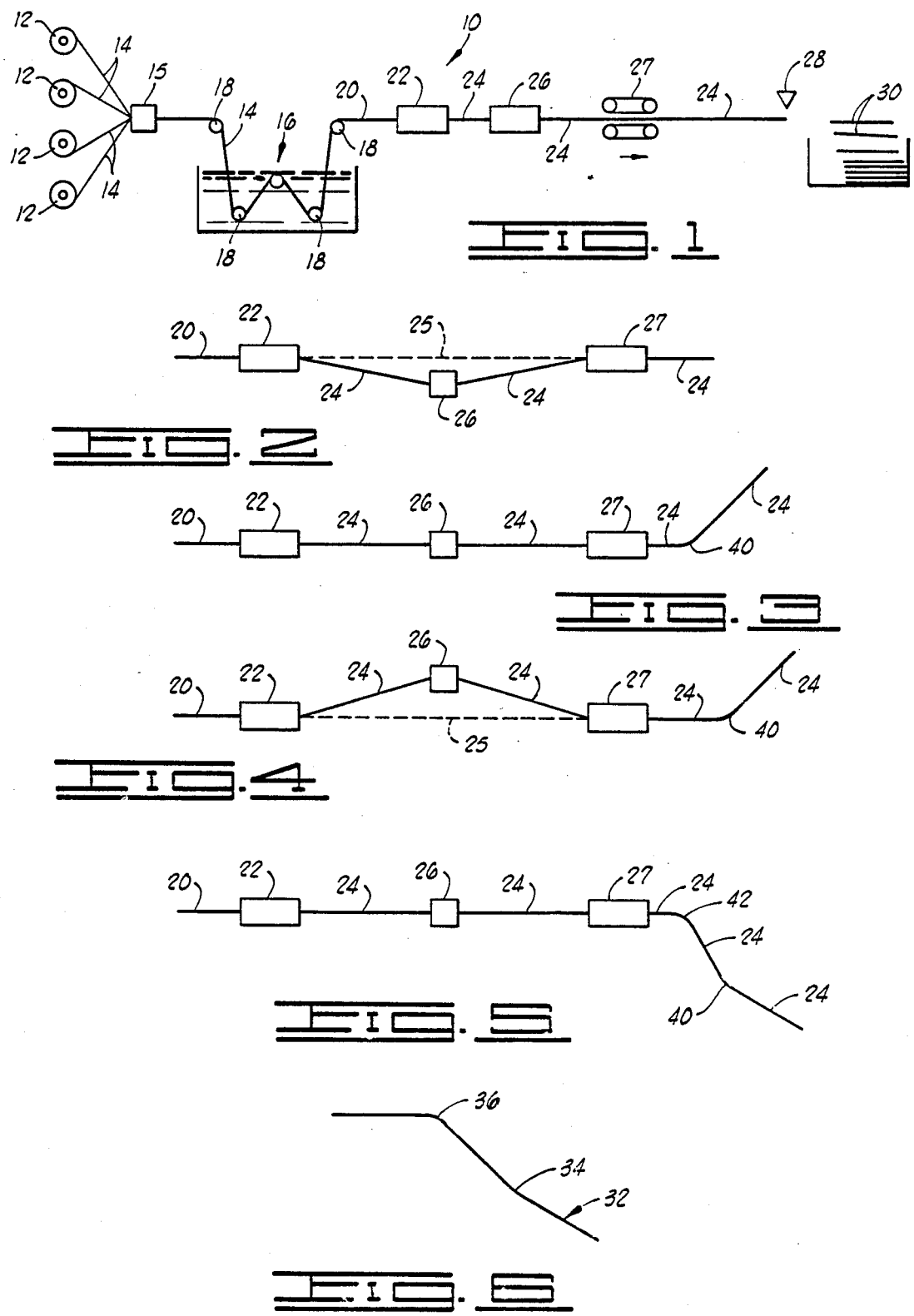

METHOD AND APPARATUS FOR PULTRUDING NON-LINEAR THERMOPLASTIC COMPOSITE ARTICLES

BACKGROUND OF THE INVENTION

1. Field Of The Invention

The present invention relates generally to a method and apparatus for pultruding non-linear thermoplastic composite articles, and more particularly, to such a method and apparatus wherein angular bends are continuously formed in a pultruded thermoplastic composite.

2. Description Of The Prior Art

The production of molded thermoset resin products reinforced with a fibrous reinforcing material by the pultrusion process is well established. In such a pultrusion process, one or more reinforcing fiber strands are pulled from a creel, passed through a thermoset resin bath for impregnation thereby and then pulled through a heated composite forming die wherein the resin matrix is formed into a desired shape and cured. Various guide, preshaping and preheating mechanisms and apparatus are commonly utilized with and/or as a part of the heated forming die. The term "heated forming die" as hereinafter used is intended to be inclusive of such guide, preshaping and preheating apparatus. A pulling mechanism located after the heated forming die causes the composite to be forwarded through the process. Generally, the formed composite is cut into articles of determined length.

Pultrusion processes for producing reinforced composite products of thermoplastic material have also been developed and used heretofore. Such processes are similar to those for producing thermoset resin composite products described above except that the thermoplastic impregnated reinforcing material is pulled through a heated forming die or a heated forming die followed by a cooling die having temperatures such that the thermoplastic material is initially melted and shaped, and then cooled to a temperature whereby the thermoplastic material is substantially solidified.

Conventional pultrusion systems operate continuously to produce linear reinforced composite articles. That is, the composite formed is pulled through the heated forming die and other parts of the pultrusion system in a substantially linear path and cut into articles of selected length, i.e., articles having linear longitudinal axes.

U.S. Pat. No. 3,873,399 to Goldsworthy et al. issued Mar. 25, 1975, discloses a method and apparatus whereby pultruded reinforced thermoset resin composite articles are formed which are curved over at least a portion of their length. The method and apparatus involves the use of cooperating die sections which are arcuately curved over their length forming a die cavity therebetween.

U.S. Pat. No. 4,469,541 to Goldsworthy issued Sept. 4, 1984, discloses a pultrusion method for producing an arcuately shaped reinforced thermoset resin composite article. The method utilizes a die channel of varying cross-sectional shape to form reinforced composite articles with non-constant cross-sectional shape with or without constant cross-sectional volume. The longitudinal axes of the articles are either linear or arcuate.

U.S. Pat. Nos. 4,194,873 dated Mar. 25, 1980, 4,289,465 dated Sept. 15, 1980, and 4,296,060 dated Oct. 20, 1981 to Killmeyer et al. disclose pultruded continuous fiber reinforced composite articles of thermoset resin matrix having non-constant cross-sectional shapes and linear longitudinal axes.

By the present invention a method and apparatus for continuously pultruding non-linear reinforced thermoplastic composite articles having one or more angular or arcuate bends therein are provided.

SUMMARY OF THE INVENTION

A method of continuously pultruding non-linear reinforced thermoplastic composite articles is provided whereby a fiber reinforcing material impregnated with a thermoplastic material is pulled through a heated forming die. The temperature of the die is such that the thermoplastic material is initially melted and upon exiting the die, the formed thermoplastic composite is still deformable. The deformable composite is moved transversely to the direction in which the composite passes through the heated forming die while being cooled to thereby produce angular bends therein. The composite is then divided into separate non-linear articles containing one or more angular bends. Apparatus for carrying out the method is also provided.

It is, therefore, a general object of the present invention to provide a method and apparatus for pultruding nonlinear thermoplastic composite articles.

Another object of the present invention is the provision of a method of continuously pultruding non-linear reinforced thermoplastic composite articles having angular bends formed therein.

Other and further objects, features and advantages of the present invention will be readily apparent to those skilled in the art upon a reading of the description of preferred embodiments which follows when taken in conjunction with the accompanying drawings.

Brief Description Of The Drawings

FIG. 1 is a schematic illustration of one form of apparatus for carrying out the method of the present invention.

FIGS. 2-5 schematically illustrate a portion of the apparatus of FIG. 1, and particularly, the operation thereof to form a non-linear reinforced thermoplastic composite article.

FIG. 6 is a side view of a non-linear reinforced thermoplastic composite article of the type formed by the apparatus illustrated in FIGS. 1-5.

DESCRIPTION OF PREFERRED EMBODIMENTS

Referring now to FIG. 1, a pultrusion system of the present invention is illustrated and generally designated by the numeral 10. The system 10 includes creels 12 from which one or more reinforcing fiber strands 14 are drawn and passed through a guide 15. From the guide 15, the strands 14 are then pulled through a bath 16 containing a thermoplastic material so that the strands are impregnated therewith.

The reinforcing fibers of the strands 14 are preferably selected from the group consisting of glass fibers, carbon fibers, aramid fibers and the like.

A variety of thermoplastic materials can be utilized in accordance with the present invention. Examples of such thermoplastic materials are poly(arylene sulfides), nylons, polycarbonates, polyamide-imides, polyetherimides, polysulfones, polyetheretherketones, polyolefins, poly(arylene sulfide sulfones), poly(arylene sulfide ketones) and the like. Of these, poly(arylene sulfide) is preferred, with poly(phenylene sulfide) being the most preferred.

The term poly(arylene sulfide) includes homopolymers and the normally solid arylene sulfide copolymers, terpolymers and the like having melting or softening points of at least about 150° C., and more preferably from about 200° C. to about 500° C. Other examples of poly(arylene sulfide) materials are poly(4, 4'-biphenylene sulfide), poly(2, 4-tolylene sulfide), and a copolymer from p-dichlorobenzene, 2, 4-dichlorotoluene and sodium sulfide, and the like.

The thermoplastic material utilized in the bath 16 can be in solid powder form, or a slurry of the powder in a liquid carrier such as water can be utilized. The fiber strands 14 are passed around several redirect bars 18 which cause the spreading of the fibers in the bath 16 and the impregnation of the fibers with the thermoplastic material. When a water slurry is used, a heated drying chamber (not shown) which removes the water and forms dry strands impregnated with solid thermoplastic material is used. In an alternate embodiment, means for supplying fiber reinforcing material already impregnated with thermoplastic material may be substituted for the strand impregnating bath 16 and associated apparatus.

The strands of thermoplastic impregnated reinforcing fiber 20 from the thermplasticv material bath 16, or alternatively, from a supply of pre-impregnated reinforcing material, pass through a heated forming die 22. As mentioned above, the heated forming die 22 can be comprised of several components in series including guide, preshaping, preheating and forming apparatus. The heated forming die 22 can be maintained at a temperature gradient which generally decreases from the entrance to the exit whereby the thermoplastic material is initially melted and then cooled while being shaped or formed. The exit temperature of the resultant formed thermoplastic composite 24 is such that the thermoplastic material is still deformable.

In lieu of a temperature gradient, the heated forming die 22 can have a uniform temperature provided the temperature is sufficient to completely melt the thermoplastic material and allow it to exit the die at a temperature whereby it is still deformable. For example, when the thermoplastic material is poly(phenylene sulfide), the temperature of the heated forming die 22 can be a uniform temperature such that the thermoplastic material is melted and the composite exits the die at approximately 300° C.

The composite 24 which exits the heated forming die 22 is pulled through a selectively movable guide 26. In its preferred form, the guide 26 consists of a cooling die maintained at a temperature such that the composite 24 entering it at a temperature whereby at least a portion of the thermoplastic material thereof is in the molten state is cooled to a temperature below the melting point of the thermoplastic material. From the guide 26, the composite material passes to a gripping/pulling mechanism 27 of the type which is commonly used in pultrusion processes. After passing through the pulling mechanism 27, the composite 24 is cut into articles 30 of desired length by a cutting device 28.

In operation of the system 10 for forming non-linear thermoplastic composite articles, as the composite 24 is pulled through the guide 26 it is cooled and periodically moved in directions transverse to the direction in which the composite passes through the heated die 22. That is, the guide 26 is reciprocatingly moved transversely which in turn reciprocatingly moves the composite 24 transversely as it is being cooled and pulled through the pultrusion system 10. This process produces, after completion of the pulling and cutting steps, composite articles containing angular bends. The term "angular bends" is used herein to mean a configuration whereby a pair of straight portions of the composite are connected together by an arcuate portion. For example, referring specifically to FIG. 6, a reinforced thermoplastic composite article 32 is illustrated containing a pair of angular bends 34 and 36.

Referring specifically to FIGS. 2-5, the operation of the guide 26 with respect to the heated forming die 22 and the pulling means 27 to form angular bends in the composite 24 is illustrated. FIG. 2 illustrates the heated forming die 22, the guide 26 and the pulling means 27 at the instant guide 26 is displaced from its usual position on the centerline of the heated forming die 22 and the pulling means 27. The centerline is indicated by a dashed line 25. The tension in composite 24 created by the pulling means 27 causes composite 24 to traverse between the heated forming die 22 and the guide 26 and between the guide 26 and the pulling means 27 in essentially straight lines. However, the angular bend produced in the composite 24 while being cooled at the instant of and as a result of the transverse movement of the guide 26 becomes fixed in the composite 24 and reappears after the tension on the composite 24 is released.

FIG. 3 illustrates the die 22, guide 26 and pulling means 27 at a point later in time when the guide 26 has been returned to and operated in its centerline position and the portion of the composite 24 which passed through the guide 26 during the operation shown in FIG. 2 has passed through the pulling means 27. Upon the release of the tension on the composite 24 as a result of passing through the pulling means 27, an angular bend 40 appears in the composite 24 which corresponds to the movement of the guide 26 shown in FIG. 2.

FIG. 4 illustrates the die 22, guide 26 and pulling means 27 at a still later time at the instant when the guide 26 is displaced in the opposite direction from the centerline 25.

FIG. 5 illustrates the die 22, guide 26 and pulling means 27 at yet a later time after the guide 26 has been returned to and operated in its centerline position and the portion of the composite 24 which passed through the guide 26 has passed through the pulling means 27. An angular bend 42 which corresponds to the movement of the guide 26 shown in FIG. 4 appears in the composite 24 after it passes through the pulling means 27.

Upon cutting the composite 24 into a length containing the angular bends 40 and 42, an article like the article 32 illustrated in FIG. 6 is formed with the bends 40 and 42 corresponding to the bends 34 and 36 of the article 32. As will be understood by those skilled in the art, the process of pulling the composite 24 through the heated forming die 22, forming angular bends therein by reciprocatingly moving the guide member 26 while the composite 24 is cooled and cutting the composite 24 with the angular bends fixed therein into articles of determined length can be carried on continuously until a desired number of non-linear articles is produced.

As will also be understood, the angular bends described can be produced by techniques other than simply displacing the guide 26 from the centerline 25. For example, if the guide 26 is elongated and is moved to a position such that its exit region is off centerline while its entry region is still on centerline, a composite will result with a bend in the same direction as if the entire guide 26 has been shifted off centerline in the opposite direction while keeping the line between its entry and exit regions parallel to centerline. Likewise, keeping the guide 26 on centerline but displacing the pulling means 27 off centerline will produce a composite with a bend in the same direction as if the guide 26 has been displaced off centerline in the opposite direction. Other variations to produce the same effect will be equally obvious to those skilled in the art.

As mentioned above, the guide 26 can take various forms, but it is preferably of a design similar to a cooling die. The temperature of the composite 24 as it passes through the guide 26 is controlled so that it is lowered from a temperature whereby the composite 24 is still deformable to a temperature below the melting point of the thermoplastic material making up the composite. As a result of the guide 26 being repeatedly moved transversely off centerline and returned on centerline, angular bends are fixed therein. Thus, the present invention is well adapted to carry out the objects and attain the ends and advantages mentioned as well as those inherent therein. While numerous changes in the construction and arrangement of parts will suggest themselves to those skilled in the art, such changes are encompassed within the spirit of this invention as defined by the appended claims.

What is claimed is:

1. A method of continuously pultruding non-linear reinforced thermoplastic composite articles comprising:
   pulling a reinforcing material impregnated with a thermoplastic material through a heated composite forming die, the temperature of said die being such that said thermoplastic material is initially melted and upon exiting said die the resulting formed thermoplastic composite is still deformable;
   moving said deformable composite transversely to the direction in which said composite passes through said heated die while cooling said composite to produce one or more angular bends therein,
   wherein said deformable composite is pulled through a cooling guide after exiting said heated die, and said cooling guide is moved transversely to the direction in which said composite passes through said heated die to thereby transversely move said composite, said moving occurring while the composite is advancing through said cooling guide; and dividing said cooled composite into separate non-linear articles.

2. The method of claim 1 wherein said thermoplastic material is selected from the group consisting of poly(arylene sulfides), nylons, polycarbonates, polyamideimides, polyetherimides, polysulfones, polyetheretherketones, polyolefins, poly(arylene sulfide sulfones) and poly(arylene sulfide ketones).

3. The method of claim 2 wherein said reinforcing material is comprised of at least one strand of fibers selected from the group consisting of glass fibers, carbon fibers and aramid fibers.

4. The method of claim 3 wherein said thermoplastic material is a poly(arylene sulfide) and said reinforcing material is selected from the group consisting of glass fibers, carbon fibers and aramid fibers.

5. The method of claim 4 wherein said poly(arylene sulfide is poly(phenylene sulfide).

6. A method of continuously pultruding non-linear reinforced thermoplastic composite articles comprising:
   impregnating at least one strand of reinforcing fibers with a thermoplastic material;
   pulling said impregnated strand of reinforcing fibers through a heated composite forming die, the temperature of said die being such that said thermoplastic material is initially melted and upon exiting said die the resulting formed thermoplastic composite is still deformable;
   moving said deformable composite transversely to the direction in which said composite passes through said heated die while cooling said composite to a temperature below the melting point of said thermoplastic material thereof to produce one or more angular bends therein,
   wherein said deformable composite is pulled through a cooling guide after exiting said heated die, and said cooling guide is moved transversely to the direction in which said composite passes through said heated die to thereby transversely move said composite, said moving occurring while the composite is advancing through said cooling guide; and cutting said cooled composite into nonlinear articles of a determined length.

7. The method of claim 6 wherein said thermoplastic material is selected from the group consisting of poly(arylene sulfides), nylons, polycarbonates, polyamideimides, polyetherimides, polysulfones, polyetheretherketones, polyolefins, poly(arylene sulfide sulfones) and poly(arylene sulfide ketones).

8. The method of claim 7 wherein said reinforcing material is comprised of at least one strand of fibers selected from the group consisting of glass fibers, carbon fibers and aramid fibers.

9. The method of claim 6 wherein said thermoplastic material is a poly(arylene sulfide) and said reinforcing material is selected from the group consisting of glass fibers, carbon fibers and aramid fibers.

10. The method of claim 9 wherein said poly(arylene sulfide) is poly(phenylene sulfide).

11. Apparatus for pultruding non-linear thermoplastic composite articles comprising:
    supply means for supplying a reinforcing material impregnated with a thermoplastic material:
    heated composite forming die means for melting said thermoplastic material and forming said reinforcing and thermoplastic materials into a composite which is still deformable upon exiting said die means:
    guide means for moving said deformable composite transversely to the direction in which said composite passes through said heated die means while cooling said composite to thereby form one or more angular bends therein,
    wherein said guide means is comprised of a cooling die, and means for selectively moving said cooling guide in directions transverse to the direction in which said composite passes through said heated die means, said moving of said cooling guide occurring while said composite is advancing through said cooling die; and
    means for pulling said impregnated reinforcing material and the composite formed therefrom from said supply means through said heated die means and said guide means.

12. The apparatus of claim 11 wherein said supply means comprises:

reinforcing material supply means for supplying at least one substantially continuous strand of fiber reinforcing material; and impregnation means for impregnating said strand with said thermoplastic material.

13. The apparatus of claim 12 which is further characterized to include means for cutting said composite into articles of determined length.

* * * * *